(12) United States Patent
Glasco et al.

(10) Patent No.: US 8,706,975 B1
(45) Date of Patent: Apr. 22, 2014

(54) MEMORY ACCESS MANAGEMENT BLOCK BIND SYSTEM AND METHOD

(75) Inventors: David B. Glasco, Austin, TX (US); John S. Montrym, Los Altos Hills, CA (US); Lingfeng Yuan, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 447 days.

(21) Appl. No.: 11/591,685

(22) Filed: Nov. 1, 2006

(51) Int. Cl.
*G06F 12/00* (2006.01)

(52) U.S. Cl.
USPC .......................... 711/147; 711/163; 711/206

(58) Field of Classification Search
None
See application file for complete search history.

(56) References Cited

U.S. PATENT DOCUMENTS

| | | |
|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,949,785 A | 9/1999 | Beasley |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,297,832 B1 | 10/2001 | Mizuyabu et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 | 12/2002 | Hill et al. |
| 6,549,997 B2 | 4/2003 | Kalyanasundharam |

(Continued)

FOREIGN PATENT DOCUMENTS

| | | |
|---|---|---|
| JP | 02288927 | 11/1990 |
| JP | 03054660 | 3/1991 |
| JP | 04182858 | 6/1992 |

OTHER PUBLICATIONS

OSROnline, (The Basics: So what is a page fault?) May 2003, p. 1-2.

(Continued)

*Primary Examiner* — Shawn X Gu

(57) ABSTRACT

A shared memory management system and method are described. In one embodiment, a memory management system includes a memory management unit for coordinating context memory storage block binds and independently controlling access to the context memory without interference from other engine activities. In one exemplary implementation the context information is included in a block and the memory management unit binds the block to instance memory. The instance memory can be protected memory. The instance memory can also support multiple channels associated with the plurality of engines. In one exemplary implementation, the instance memory includes a pointer to a page table. The instance memory can also include context save and restore data and each one of the plurality of engines initiates a unique block bind by indicating an association between their engine ID and a given block of instance memory.

18 Claims, 11 Drawing Sheets

(56) References Cited

U.S. PATENT DOCUMENTS

| | | | |
|---|---|---|---|
| 6,636,223 | B1 | 10/2003 | Morein |
| 6,658,538 | B2 | 12/2003 | Arimilli et al. |
| 6,742,104 | B2 | 5/2004 | Chauvel et al. |
| 6,813,699 | B1 | 11/2004 | Belgard |
| 6,823,433 | B1 | 11/2004 | Barnes et al. |
| 6,839,813 | B2 | 1/2005 | Chauvel |
| 6,859,208 | B1 | 2/2005 | White |
| 6,877,077 | B2 | 4/2005 | McGee et al. |
| 6,883,079 | B1 | 4/2005 | Priborsky |
| 7,007,075 | B1 | 2/2006 | Coffey |
| 7,082,508 | B2 | 7/2006 | Khan et al. |
| 7,107,411 | B2 | 9/2006 | Burton et al. |
| 7,107,441 | B2 | 9/2006 | Zimmer et al. |
| 7,120,715 | B2 | 10/2006 | Chauvel et al. |
| 7,159,095 | B2 | 1/2007 | Dale et al. |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 7,730,489 | B1 | 6/2010 | Duvur et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1 | 3/2006 | Schoinas et al. |
| 2006/0187945 | A1 | 8/2006 | Andersen |
| 2006/0195683 | A1* | 8/2006 | Kissell .......................... 712/228 |
| 2006/0230223 | A1 | 10/2006 | Kruger et al. |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

OTHER PUBLICATIONS

Non-Final OA Dated Aug. 19, 2009; U.S. Appl. No. 11/592,076.
Non-Final OA Dated May 28, 2009; U.S. Appl. No. 11/523,830.
Non-Final OA Dated Sep. 15, 2008; U.S. Appl. No. 11/523,830.
Non-Final OA Dated Jan. 20, 2010; U.S. Appl. No. 11/586,756.
Final OA Dated Jun. 4, 2009; U.S. Appl. No. 11/586,756.
Non-Final OA Dated Nov. 18, 2008; U.S. Appl. No. 11/586,756.
Non-Final OA Dated Aug. 19, 2009; U.S. Appl. No. 11/591,857.
Final OA Dated Nov. 23, 2009; U.S. Appl. No. 11/592,106.
Non-Final OA Dated Apr. 1, 2009; U.S. Appl. No. 11/592,106.
Non-Final OA Dated Oct. 29, 2008; U.S. Appl. No. 11/523,950.
Notice of Allowance Dated Apr. 24, 2009; U.S. Appl. No. 11/523,950.
Notice of Allowance Dated Sep. 3, 2009; U.S. Appl. No. 11/523,950.
Notice of Allowance Dated Dec. 24, 2009; U.S. Appl. No. 11/523,950.
Non-Final OA Dated Dec. 16, 2008; U.S. Appl. No. 11/586,826.
Non-Final OA Dated Feb. 17, 2009; U.S. Appl. No. 11/592,819.
Final OA Dated Nov. 9, 2009; U.S. Appl. No. 11/591,629.
Non-Final OA Dated Feb. 20, 2009; U.S. Appl. No. 11/591,629.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non-Final OA Dated Nov. 13, 2008; U.S. Appl. No. 11/588,177.
Final OA Dated Dec. 8, 2009; U.S. Appl. No. 11/591,856.
Non-Final OA Dated May 11, 2009; U.S. Appl. No. 11/591,856.
Final OA Dated Oct. 14, 2009; U.S. Appl. No. 11/586,825.
Non-Final OA Dated Mar. 18, 2009; U.S. Appl. No. 11/586,825.
Notice of Allowance; Mail Date Jan. 29, 2010; U.S. Appl. No. 11/592,076.
Restriction Requirement; Mail Date Apr. 28, 2009; U.S. Appl. No. 11/592,076.
Final Office Action; Mail Date Mar. 16, 2010; U.S. Appl. No. 11/523,830.
Restriction Requirement; Mail Date Apr. 27, 2009; U.S. Appl. No. 11/591,857.
Notice of Allowance; Mail Date Jun. 22, 2009; U.S. Appl. No. 11/586,826.
Notice of Allowance; Mail Date Dec. 14, 2009; U.S. Appl. No. 11/586,826.
Non Final Office Action; Mail Date Mar. 17, 2010; U.S. Appl. No. 11/592,819.
Notice of Allowance; Mail Date Jan. 19, 2010; U.S. Appl. No. 11/592,819.
Non Final Office Action; Mail Date Feb. 22, 2010; U.S. Appl. No. 11/586,825.
Harper et al., (Rapid recovery from transient Faults in the fault tolerant processor with fault-tolerant shared memory); Aug. 1990, IEEE, pp. 350-359.
Ooi, (Fault Tolerant Architecture in a cache memory control LSI), IEEE, pp. 507-514; Apr. 1992.
Oracle, (Oracle 8i Parallel server), 1999, Oracle, Release 2 (8.1.6) 1-216; Dec. 1999.
PCMAG (Definition of: Page fault) PCMag, 1 Page; Mar. 2009.
Shalan. (Dynamic Memory Management for embedded real-time multiprocessor system on a chip), ACM. pp. 180-186; Nov. 2000.
Shalan. (Dynamic Memory Management for embedded real-time multiprocessor system on a chip), Georgia Inst. Of Tech. 1-118; Nov. 2003.
Wikipedia, (Page Fault definition) Wikipedia, pp. 1-4 ; Mar. 2009.
Chaudhuri, "The impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, Rise 2005, pp. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Restriction, Mailed Apr. 28, 2009; U.S. Appl. No. 11/592,076.
Notice of Allowance, Mailed Jan. 29, 2010; U.S. Appl. No. 11/592,076.
Notice of Allowance, Mailed May 4, 2010; U.S. Appl. No. 11/592,076.
Notice of Allowance, Mailed Aug. 13, 2010; U.S. Appl. No. 11/592,076.
Notice of Allowance, Mailed Nov. 26, 2010; U.S. Appl. No. 11/592,076.
Notice of Restriction, Mailed Aug. 10, 2010; U.S. Appl. No. 12/650,068.
Final Office Action, Mailed Mar. 16, 2010; U.S. Appl. No. 11/523,830.
Notice of Allowance, Mailed Jun. 28, 2010; U.S. Appl. No. 11/523,830.

(56) References Cited

OTHER PUBLICATIONS

Notice of Allowance, Mailed Sep. 2, 2010; U.S. Appl. No. 11/523,830.
Notice of Allowance, Mailed Jan. 20, 2011; U.S. Appl. No. 11/523,830.
Notice of Allowance, Mailed May 5, 2011; U.S. Appl. No. 11/523,830.
Final Office Action, Mailed Aug. 1, 2010; U.S. Appl. No. 11/586,756.
Notice of Allowance, Mailed Dec. 27, 2010; U.S. Appl. No. 11/586,756.
Notice of Allowance, Mailed May 12, 2011; U.S. Appl. No. 11/586,756.
Office Action, Mailed Apr. 27, 2009; U.S. Appl. No. 11/591,857.
Non-Final Office Action, Mailed Dec. 7, 2010; U.S. Appl. No. 11/591,857.
Notice of Allowance, Mailed Mar. 18, 2011; U.S. Appl. No. 11/591,857.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Sep. 19, 2008; U.S. Appl. No. 11/523,926.
Final Office Action, Mailed Apr. 10, 2009; U.S. Appl. No. 11/523,926.
Non-Final Office Action, Mailed Oct. 1, 2009; U.S. Appl. No. 11/523,926.
Notice of Allowance; Mailed Mar. 29, 2010; U.S. Appl. No. 11/523,926.
Notice of Allowance; Mailed Jul. 9, 2010; U.S. Appl. No. 11/523,926.
Notice of Allowance; Mailed Oct. 27, 2010; U.S. Appl. No. 11/523,926.
Notice of Allowance; Mailed Jul. 21, 2010; U.S. Appl. No. 11/523,950.
Notice of Allowance; Mailed Nov. 3, 2010; U.S. Appl. No. 11/523,950.
Notice of Allowance, Mailed Jun. 22, 2009; U.S. Appl. No. 11/586,826.
Notice of Allowance, Mailed Dec. 14, 2009; U.S. Appl. No. 11/586,826.
Notice of Allowance; Mailed Oct. 16, 2009; U.S. Appl. No. 11/592,819.
Non-Final Office Action, Mailed Mar. 17, 2010; U.S. Appl. No. 11/592,819.
Notice of Allowance; Mailed Nov. 23, 2010; U.S. Appl. No. 11/592,819.
Non-Final Office Action, Mailed May 27, 2010; U.S. Appl. No. 11/591,629.
Non-Final Office Action, Mailed Nov. 3, 2010; U.S. Appl. No. 11/591,629.
Final Office Action, Mailed Jun. 8, 2011; U.S. Appl. No. 11/591,629.
Non-Final Office Action, Mailed Apr. 28, 2010; U.S. Appl. No. 11/592,780.
Non-Final Office Action, Mailed Oct. 13, 2010; U.S. Appl. No. 11/592,780.
Final Office Action, Mailed Apr. 27, 2010; U.S. Appl. No. 11/588,177.
Non-Final Office Action, Mailed Apr. 27, 2010; U.S. Appl. No. 11/591,856.
Notice of Allowance, Mailed Nov. 12, 2010; U.S. Appl. No. 11/591,856.
Notice of Allowance, Mailed Mar. 9, 2011; U.S. Appl. No. 11/591,856.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Notice of Allowance, Mailed Mar. 4, 2011; U.S. Appl. No. 11/586,825.
Notice of Allowance, Mailed Mar. 17, 2011; U.S. Appl. No. 11/592,076.
Notice of Allowance, Mailed Jun. 29, 2011; U.S. Appl. No. 11/592,076.
Notice of Allowance, Mailed Oct. 14, 2011; U.S. Appl. No. 11/592,076.
Notice of Allowance, Mailed Jan. 27, 2012; U.S. Appl. No. 11/592,076.
Notice of Allowance, Mailed May 1, 2012; U.S. Appl. No. 11/592,076.
Office Action, Mailed Feb. 1, 2011; U.S. Appl. No. 12/650,068.
Office Action, Mailed Aug. 9, 2011; U.S. Appl. No. 12/650,068.
Office Action, Mailed Nov. 16, 2011; U.S. Appl. No. 12/650,068.
Notice of Allowance, Mailed May 1, 2012; U.S. Appl. No. 12/650,068.
Notice of Allowance, Mailed Jul. 21, 2011; U.S. Appl. No. 11/523,830.
Notice of Allowance, Mailed Oct. 26, 2011; U.S. Appl. No. 11/523,830.
Notice of Allowance, Mailed Feb. 2, 2012; U.S. Appl. No. 11/523,830.
Notice of Allowance, Mailed May 10, 2012; U.S. Appl. No. 11/523,830.
Notice of Allowance, Mailed Aug. 25, 2011; U.S. Appl. No. 11/586,756.
Notice of Allowance, Mailed Jan. 13, 2012; U.S. Appl. No. 11/586,756.
Notice of Allowance, Mailed May 15, 2012; U.S. Appl. No. 11/586,756.
Office Action, Mailed May 4, 2010; U.S. Appl. No. 11/591,857.
Notice of Allowance, Mailed Jul. 21, 2011; U.S. Appl. No. 11/591,857.
Notice of Allowance, Mailed Oct. 28, 2011; U.S. Appl. No. 11/591,857.
Notice of Allowance, Mailed Feb. 10, 2012; U.S. Appl. No. 11/591,857.
Office Action, Mailed Jul. 5, 2011; U.S. Appl. No. 11/592,106.
Office Action, Mailed Dec. 2, 2011; U.S. Appl. No. 11/592,106.
Office Action, Mailed May 10, 2012; U.S. Appl. No. 11/592,106.
Notice of Allowance, Mailed Feb. 3, 2011; U.S. Appl. No. 11/523,926.
Notice of Allowance, Mailed May 23, 2011; U.S. Appl. No. 11/523,926.
Notice of Allowance, Mailed Aug. 23, 2011; U.S. Appl. No. 11/523,926.
Notice of Allowance, Mailed Oct. 28, 2011; U.S. Appl. No. 11/523,926.
Notice of Allowance, Mailed Feb. 24, 2012; U.S. Appl. No. 11/523,926.
Notice of Allowance, Mailed Jun. 9, 2011; U.S. Appl. No. 11/523,950.
Notice of Allowance, Mailed 068-30/2011; U.S. Appl. No. 11/523,950.
Notice of Allowance, Mailed Nov. 14, 2011; U.S. Appl. No. 11/523,950.
Notice of Allowance, Mailed Feb. 16, 2011; U.S. Appl. No. 11/586,826.
Notice of Allowance, Mailed Jul. 26, 2011; U.S. Appl. No. 11/586,826.
Notice of Allowance, Mailed Dec. 27, 2011; U.S. Appl. No. 11/586,826.
Notice of Allowance, Mailed Apr. 19, 2011; U.S. Appl. No. 11/592,819.
Notice of Allowance, Mailed Sep. 7, 2011; U.S. Appl. No. 11/592,819.
Notice of Allowance, Mailed Dec. 9, 2011; U.S. Appl. No. 11/592,819.
Office Action, Mailed Apr. 12, 2011; U.S. Appl. No. 11/592,780.
Office Action, Mailed Nov. 1, 2011; U.S. Appl. No. 11/592,780.
Office Action, Mailed May 7, 2012; U.S. Appl. No. 11/592,780.
Office Action, Mailed Jun. 7, 2011; U.S. Appl. No. 11/588,177.

(56) References Cited

OTHER PUBLICATIONS

Office Action, Mailed Nov. 29, 2011; U.S. Appl. No. 11/588,177.
Notice of Allowance, Mailed Jun. 17, 2011; U.S. Appl. No. 11/591,856.
Notice of Allowance, Mailed Sep. 26, 2011; U.S. Appl. No. 11/591,856.
Notice of Allowance, Mailed Jan. 5, 2012; U.S. Appl. No. 11/591,856.
Notice of Allowance, Mailed Jun. 16, 2011; U.S. Appl. No. 11/586,825.
Notice of Allowance, Mailed Aug. 9, 2011; U.S. Appl. No. 11/586,825.
Notice of Allowance, Mailed Dec. 8, 2011; U.S. Appl. No. 11/586,825.
Notice of Allowance, Mailed Mar. 21, 2012; U.S. Appl. No. 11/586,825.
Notice of Allowance Dated Aug. 25, 2011; U.S. Appl. No. 11/586,756.
Final Office Action Dated May 4, 2010; U.S. Appl. No. 11/591,857.
Notice of Allowance Dated Jul. 21, 2011; U.S. Appl. No. 11/591,857.
Final Office Action Dated Jul. 5, 2011; U.S. Appl. No. 11/592,106.
Notice of Allowance Dated Feb. 3, 2011; U.S. Appl. No. 11/523,926.
Notice of Allowance Dated May 23, 2011; U.S. Appl. No. 11/523,926.
Notice of Allowance Dated Aug. 23, 2011; U.S. Appl. No. 11/523,926.
Notice of Allowance Dated Jun. 9, 2011; U.S. Appl. No. 11/523,950.
Notice of Allowance Dated Aug. 30, 2011; U.S. Appl. No. 11/523,950.
Notice of Allowance Dated Feb. 16, 2011; U.S. Appl. No. 11/586,826.
Notice of Allowance Dated Jul. 26, 2011; U.S. Appl. No. 11/586,826.
Notice of Allowance Dated Apr. 19, 2011; U.S. Appl. No. 11/592,819.
Notice of Allowance Dated Sep. 7, 2011; U.S. Appl. No. 11/592,819.
Final Office Action Dated Apr. 12, 2011; U.S. Appl. No. 11/592,780.
Non-Final Office Action Dated Jun. 7, 2011; U.S. Appl. No. 11/588,177.
Notice of Allowance Dated Jun. 17, 2011; U.S. Appl. No. 11/591,856.
Notice of Allowance Dated Jun. 16, 2011; U.S. Appl. No. 11/586,825.
Notice of Allowance Dated Aug. 9, 2011; U.S. Appl. No. 11/586,825.
Notice of Allowance Dated Jul. 21, 2011; U.S. Appl. No. 11/523,830.
Notice of Allowance Dated Mar. 17, 2011; U.S. Appl. No. 11/592,076.
Notice of Allowance Dated Jun. 29, 2011; U.S. Appl. No. 11/592,076.
Non-Final Office Action Dated Feb. 1, 2011; U.S. Appl. No. 12/650,068.
Notice of Allowance Dated May 10, 2012; U.S. Appl. No. 11/523,830.
Notice of Allowance Dated May 15, 2012; U.S. Appl. No. 11/586,756.
Notice of Allowance Dated May 25, 2012; U.S. Appl. No. 11/591,857.
Final Office Action Dated May 10, 2012; U.S. Appl. No. 11/592,106.
Notice of Allowance Dated Jun. 1, 2012; U.S. Appl. No. 11/523,926.
Notice of Allowance Dated Jul. 5, 2012; U.S. Appl. No. 11/586,826.
Notice of Allowance Dated Jun. 7, 2012; U.S. Appl. No. 11/592,819.
Final Office Action Dated May 7, 2012; U.S. Appl. No. 11/592,780.
Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Jul. 6, 2012; U.S. Appl. No. 11/586,825.
Notice of Allowance Dated Oct. 14, 2011; U.S. Appl. No. 11/592,076.
Notice of Allowance Dated Jan. 27, 2012; U.S. Appl. No. 11/592,076.
Notice of Allowance Dated May 10, 2012; U.S. Appl. No. 11/592,076.
Notice of Allowance Dated Feb. 2, 2012; U.S. Appl. No. 11/523,830.
Notice of Allowance Dated Oct. 26, 2011; U.S. Appl. No. 11/523,830.
Notice of Allowance Dated Jan. 13, 2012; U.S. Appl. No. 11/586,756.
Notice of Allowance Dated Oct. 28, 2011; U.S. Appl. No. 11/591,857.
Notice of Allowance Dated Feb. 10, 2012; U.S. Appl. No. 11/591,857.
Notice of Allowance Dated Oct. 28, 2011; U.S. Appl. No. 11/523,926.
Notice of Allowance Dated Feb. 24, 2012; U.S. Appl. No. 11/523,926.
Notice of Allowance Dated Nov. 14, 2011; U.S. Appl. No. 11/523,950.
Notice of Allowance Dated Dec. 27, 2011; U.S. Appl. No. 11/586,826.
Notice of Allowance Dated Dec. 9, 2011; U.S. Appl. No. 11/592,819.
Notice of Allowance Dated Sep. 26, 2011; U.S. Appl. No. 11/591,856.
Notice of Allowance Dated Jan. 5, 2012; U.S. Appl. No. 11/591,856.
Notice of Allowance Dated Dec. 8, 2011; U.S. Appl. No. 11/586,825.
Notice of Allowance Dated Mar. 21, 2012; U.S. Appl. No. 11/586,825.
Non-Final Office Action Dated Dec. 2, 2011; U.S. Appl. No. 11/592,106.
Final Office Action Dated Nov. 29, 2011; U.S. Appl. No. 11/588,177.
Final Office Action Dated Aug. 9, 2011; U.S. Appl. No. 12/650,068.
Non-Final Office Action Dated Nov. 1, 2011; U.S. Appl. No. 11/592,780.
Guelfi et al., (Rapid Integration of Software Engineering Techniques) 2005, Second International Workshop, 9 pages.
Non-Final Office Action Dated Nov. 16, 2011; U.S. Appl. No. 12/650,068.
Notice of Allowance Dated May 1, 2012; U.S. Appl. No. 12/650,068.
Notice of Allowance Dated Jul. 6, 2012; U.S. Appl. No. 12/650,068.
Notice of Allowance dated Aug. 16, 2012; U.S. Appl. No. 11/592,076, filed Nov. 1, 2006.
Notice of Allowance dated Sep. 17, 2012; U.S. Appl. No. 12/650,068, filed Dec. 30, 2009.
Notice of Allowance dated Aug. 29, 2012; U.S. Appl. No. 11/523,830, filed Sep. 19, 2006.
Notice of Allowance dated Nov. 20, 2012; U.S. Appl. No. 11/586,756, filed Oct. 24, 2006.
Notice of Allowance dated Sep. 18, 2012; U.S. Appl. No. 11/591,857, filed Nov. 1, 2006.
Notice of Allowance dated Sep. 12, 2012; U.S. Appl. No. 11/523,926, filed Sep. 19, 2006.
Notice of Allowance dated Oct. 5, 2012; U.S. Appl. No. 11/592,819, filed Nov. 2, 2006.
Non-Final Office Action dated Sep. 14, 2012; U.S. Appl. No. 11/591,629, filed Nov. 1, 2006.
Notice of Allowance dated Sep. 14, 2012; U.S. Appl. No. 11/588,177, filed Oct. 24, 2006.
Notice of Allowance dated Sep. 17, 2012; U.S. Appl. No. 11/591,856, filed Nov. 1, 2006.
Notice of Allowance Dated Oct. 12, 2012; U.S. Appl. No. 11/586,825, filed Oct. 24, 2006.
Wikipedia, (CPU Cache Definition), www.wikipedia.com, pp. 1-16, Jan. 26, 2010.
Notice of Allowance dated Jan. 28, 2013; U.S. Appl. No. 12/650,068.
Notice of Allowance dated May 10, 2013; U.S. Appl. No. 12/650,068.
Notice of Allowance dated Feb. 20, 2013; U.S. Appl. No. 11/586,756.
Notice of Allowance dated Feb. 1, 2013; U.S. Appl. No. 11/591,857.
Notice of Allowance dated May 23, 2013; U.S. Appl. No. 11/591,857.
Notice of Allowance dated Feb. 31, 2013; U.S. Appl. No. 11/591,857.
Final Office Action dated Jun. 6, 2013; U.S. Appl. No. 11/592,106.
Non Final Office Action dated Jan. 3, 2013; U.S. Appl. No. 11/592,106.
Notice of Allowance dated Apr. 2, 2013; U.S. Appl. No. 11/523,950.
Notice of Allowance dated May 16, 2013; U.S. Appl. No. 11/523,950.
Notice of Allowance dated May 16, 2013; U.S. Appl. No. 11/586,826.
Notice of Allowance dated Jan. 24, 2013; U.S. Appl. No. 11/592,819.
Notice of Allowance dated May 8, 2013; U.S. Appl. No. 11/592,819.

(56) References Cited

OTHER PUBLICATIONS

Notice of Allowance dated Mar. 7, 2013; U.S. Appl. No. 11/591,629.
Notice of Allowance dated Mar. 18, 2013; U.S. Appl. No. 11/588,177.
Notice of Allowance dated Jan. 17, 2013; U.S. Appl. No. 11/591,856.
Notice of Allowance dated Apr. 30, 2013; U.S. Appl. No. 11/591,856.
Notice of Allowance dated Jul. 29, 2013; U.S. Appl. No. 12/650,068; Inventor: Glasco, D.; Application Filed Dec. 30, 2009.
Notice of Allowance dated Jul. 18, 2013; U.S. Appl. No. 11/586,756; Inventor: Glasco, D; Application Filed Oct. 24, 2006.
Office Action dated Oct. 3, 2013; U.S. Appl. No. 11/592,106; Inventor: Glasco, D.; Application Filed Nov. 1, 2006.
Notice of Allowance dated Aug. 26, 2013; U.S. Appl. No. 11/586,826; Inventor: Glasco, D.; Application Filed Nov. 24, 2006.
Notice of Allowance dated Aug. 1, 2013; U.S. Appl. No. 11/592,819; Inventor: Van Dyke, J.; Application Filed Nov. 2, 2006.
Notice of Allowance dated Jul. 30, 2013; U.S. Appl. No. 11/591,629; Inventor: Glasco, D.; Application Filed Nov. 1, 2006.
Office Action dated Sep. 10, 2013; U.S. Appl. No. 11/592,780; Inventor: Glasco, D.; Application Filed Nov. 3, 2006.
Notice of Allowance dated Sep. 12, 2013; U.S. Appl. No. 11/588,177; Inventor: Glasco, D.; Application Filed Oct. 24, 2006.
Notice of Allowance dated Feb. 7, 2013; U.S. Appl. No. 11/586,826; Inventor: Glasco, D.; Application Filed Nov. 24, 2006.

* cited by examiner

500

510

RECEIVING AN INDICATION OF A CONTEXT SESSION INITIATION.

520

ASSIGNING A PHYSICAL MEMORY SPACE TO THE CONTEXT SESSION.

530

PERFORMING VIRTUAL MEMORY ADDRESS TO THE ASSIGNED PHYSICAL MEMORY ADDRESS TRANSLATION FOR CONTEXT INFORMATION ASSOCIATED WITH THE CONTEXT SESSION.

RECEIVING AN INDICATION OF A CONTEXT SESSION INITIATION.

620

PERFORMING A BLOCK BIND.

630

PERFORMING VIRTUAL MEMORY ADDRESS TO THE ASSIGNED PHYSICAL MEMORY ADDRESS TRANSLATION FOR CONTEXT INFORMATION ASSOCIATED WITH THE CONTEXT SESSION.

FIG 6

MEMORY ACCESS MANAGEMENT BLOCK BIND SYSTEM AND METHOD

FIELD OF THE INVENTION

The present invention relates to the field of information processing. In particular, the present invention relates to a system and method for shared resource access management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Electronic systems providing these advantageous results often include shared resources. However, designing and building systems that efficiently access and utilize a shared resource is often challenging. Coordinating the access to shared resources can be highly complex and resource intensive.

Memory or storage is usually a very important component of a number of systems. Memories typically store information utilized by a system in performance of a number of different tasks. Other components of a system typically request access to a memory in order to retrieve (e.g., "read") information from or forward (e.g., "write") information to the memory. Different types of memories (e.g., bulk storage, main memory, removable memory etc.) and or memory "spaces" (e.g., virtual, physical, etc.) can be utilized to support information storage.

Different types of memory can potentially offer different features. For example, different types of memories typically have different relative storage capacities and relatively different access speeds. Traditionally, systems that have relatively large storage capacity have relatively slow access speeds and systems that have relatively fast access speeds have relatively small storage capacities. For example, main system memories are relatively fast compared to bulk storage memories but typically store less information. A number of systems transfer chunks of information between relatively fast small memories and relatively slow bulk memories in an attempt to optimize speed and capacity.

Traditional computer systems also often run programs that utilize virtual memory space addressing. Typically the computer system performs a translation between the virtual memory space addressing and physical memory space addressing. However, errors or faults can occur during the translation between virtual memory space addressing and physical memory space addressing. For example, when performing virtual to physical memory space translation a fault can occur when a translation map or a physical page is not resident. Faults or errors in storing information can cause problems for continued proper operation and/or accurate results.

SUMMARY

A shared memory management system and method are described. In one embodiment, a memory management system includes a memory management unit for coordinating context memory storage block binds and independently controlling access to the context memory without interference from other engine activities. In one exemplary implementation the context information is included in a block and the memory management unit binds a particular block in instance memory to a particular engine. The instance memory can be protected memory. The instance memory can also support multiple channels associated with the plurality of engines. In one exemplary implementation, the instance memory includes a pointer to a page table. The instance memory can also include context save and restore data and each one of the plurality of engines initiates a unique block bind by indicating an association between their engine ID and a given block of instance memory.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 5 is a flow chart of an exemplary memory management method in accordance with one embodiment of the present invention.

FIG. 6 is a flow chart of an exemplary management method in accordance with one embodiment of the present invention.

DETAILED DESCRIPTION

Figure 1:
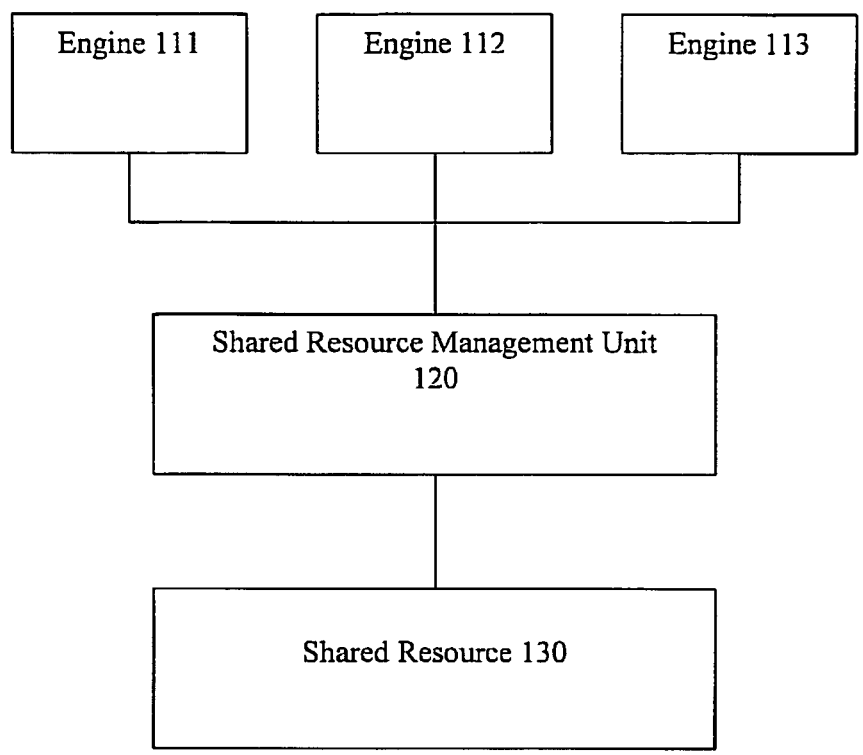
FIG. 1 is a block diagram of an exemplary shared resource management system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a block diagram of an exemplary shared resource management system 100 in accordance with one embodiment of the present invention. Exemplary shared resource management system 100 includes engine 111, engine 112, engine 113, shared resource management unit 120 and shared resource 130. Engine 111, engine 112, and engine 113 are communicatively coupled to shared resource management unit 120 which in turn is communicatively coupled to shared resource 130.

The components of exemplary shared resource management system 100 cooperatively operate to facilitate efficient management of access to a shared resource by a plurality of engines. Engine 111, engine 112 and engine 113 perform various processing activities. In one embodiment, each engine can perform processing activities for a variety of clients. Shared resource 130 supports the processing by engines 111, 112 and 113. In one exemplary implementation, shared resource 130 is a memory for storing information utilized by engines 111, 112, and/or 113. Shared resource management unit 120 independently controls access to the shared resource 130.

By independently controlling access to the shared resource 130, shared resource management system 100 facilitates efficient resolution of access problems. For example, the shared resource management unit 120 allows a second one of the plurality of engines to access the shared resource even if a fault occurs while a first one of the plurality of engines is attempting to access the shared resource. In one exemplary implementation, shared resource management unit 120 permits a first one of the plurality of engines to access shared resource 130 until a problem occurs then prevents further access by the first one of the plurality of engines until the problem is resolved. For example, shared resource management unit 120 issues NACKs in response to access requests from the first one of the plurality of engines until the problem is resolved. Shared resource management unit 120 can permit other engines to access the shared resource 130 even while issuing NACKs to the first one of the plurality of engines. In one embodiment, shared resource management system 100 manages accesses to a shared memory and the shared resource management unit 120 handles a plurality of contexts.

Figure 2:
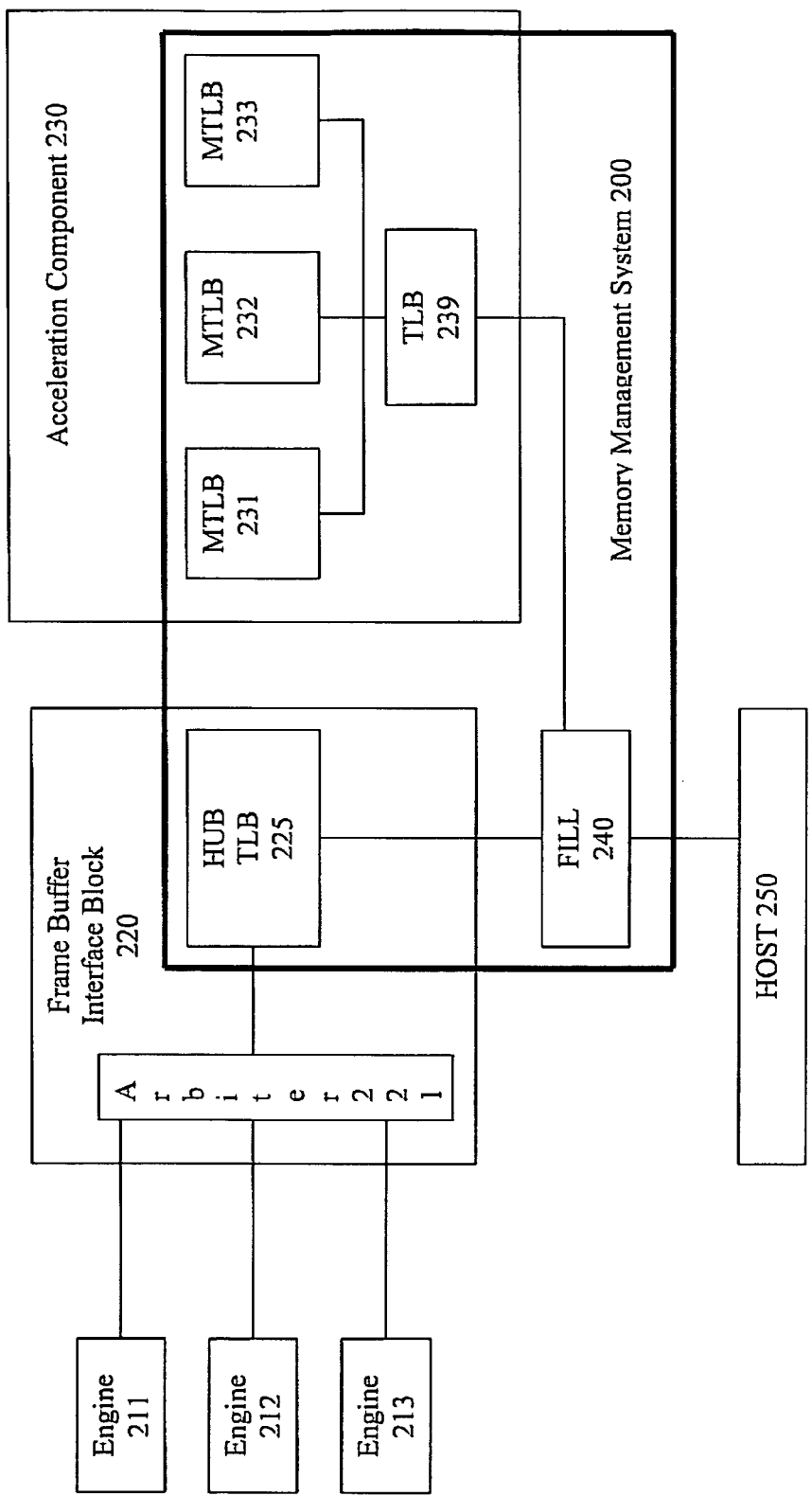
FIG. 2 is a block diagram of an exemplary memory management system in accordance with one embodiment of the present invention

FIG. 2 is a block diagram of exemplary memory management system 200, in accordance with one embodiment of the present invention. In one exemplary implementation, memory management system 200 is referred to as a memory management unit (MMU). Memory management system 200 facilitates efficient memory access. Memory management system 200 includes shared translation buffers (e.g., hub translation buffer TLB 225 and TLB 239), dedicated micro translation buffers (e.g., TLBs 231, 232 and 233) and fill component 240. Shared translation buffers and dedicated micro translation buffers translate virtual addresses to physical addresses. Fill component 240 coordinates memory translation lookaside buffer invalidation and fetches page table entry information for the translation look aside buffers (e.g., on TLB misses). If there is a miss in the translation (e.g., information is not stored in a current cache location) a notification is sent to the fill component 240. The fill component 240 puts together a memory request packet and forwards it to a frame buffer to retrieve translation data. In one embodiment, the fill component 240 can put together memory request packets associated with page table entries for translating between virtual and physical memory spaces.

Notifications of faults are forwarded to the fill component 240. Fill component 240 forwards a post-fault expediting response. In one exemplary implementation, when an access request from an engine (e.g., 211) encounters a fault, fill component 240 forwards Negative Acknowledgements (NACKs) in response to that request and additional memory access requests from the engine (e.g., 211) until the fault is resolved. Fill component 240 can permit other engines (e.g., 212, 213) to continue memory accesses normally unless a respective independent request from the other engines encounters a fault.

Fill component 240 can implement the fault occurrence notification through the hierarchy in a reactive manner or a "lazy" notification manner. For example, in a reactive notification scheme a first engine (e.g., 211) memory access request fault notification discovered in Hub TLB 225 is forwarded both up the hierarchy (e.g. to fill component 240) and "directly" to other TLB's in other branches of the hierarchy (e.g., MTLB 231, 232, 233) and the other TLB's also issue NACKS in response to access requests associated with the first engine's (e.g., 211) activities. By issuing the notification reactively the other TLB's do not have to wait for notification to "traverse" up the hierarchy (e.g. up to fill unit 240) and back down. In a "lazy" notification scheme for the memory access request fault notification discovered in Hub TLB 225, while notification is forwarded up the hierarchy, notification is not forwarded "directly" to other TLB's in other branches of the hierarchy (e.g., MTLB 231, 232, 233) and the other TLB's continue to issue ACKS until encountering a fault themselves or receiving notification from higher up in the hierarchy.

In one embodiment, memory management unit 200 facilitates virtualization of context information storage. Memory management unit 200 can permit context information to be stored and retrieved from bulk storage on the fly. Memory management unit 200 allows context information to be stored in varying physical memory locations. In one embodiment accesses to store the context information are immune to post-fault response. For example, memory management unit 200 does not issue a pre-emptive NACK for memory accesses associated with context information. In one exemplary implementation, memory management unit 200 handles a plurality of contexts.

In one embodiment, memory management unit 200 coordinates binding of context information associated with memory access requests from the plurality of engines. In one exemplary implementation the context information is included in a block and the memory management unit binds the block to a particular engine and stores the information in an instance memory. The instance memory can be protected memory. The instance memory can also support multiple channels associated with the plurality of engines. In one exemplary implementation, the instance memory includes a pointer to a page table. The instance memory can also include context save and restore data and each one of the plurality of engines initiates a unique block bind by indicating an association between their engine ID and a given block of instance memory.

In one embodiment, memory management unit 200 stores the address of a block of translation data associated with each engine. In one exemplary implementation, each engine participates in a binding mechanism in which each engine specifies to memory management unit 200 the base address of a memory region in which the virtual address to physical address translation data is stored. An engine which uses a single virtual memory space and hence a single set of translation data, can prior to issuing any translation requests send a block bind operation to memory management unit 200. In one embodiment, a segmentation data binding mechanism provides an address that is an offset to the base address. One exemplary segmentation caching mechanism is described in concurrent patent application entitled "Direct Memory Access Techniques That Include Caching Segmentation Data", patent application Ser. No. 11/523,830, filed Sep. 19, 2006, which is incorporated herein by this reference. In one exemplary implementation, a first level of the page tables is also stored at a fixed offset from the base address.

In one embodiment, an engine sends memory management unit 200 a new block bind when the engine switches context. Page tables and segmentation data need not be swapped in and out to switch contexts. In addition, a block of data specifying the translation data can be moved or swapped out of the memory space. In one exemplary implementation, if the translation data is resident in memory, an engine can be given a base address in a block bind operation to restart a context.

In one embodiment, memory management unit 200 concurrently manages memory accesses for the plurality of engines. Memory management unit 200 facilitates concurrent memory access translations for the plurality of engines. In one exemplary implementation, the memory management unit tracks an identifier for each of the plurality of engines making a memory access request. The memory management unit associates each of the plurality of engines with particular translation information respectively. In one embodiment, the translation information is stored in a portion of instance memory. Memory management unit 200 can be non-blocking. Memory management unit 200 can also permit a hit under miss.

In one embodiment, memory management system 200 is included in a graphics system. The graphics system includes engine 211, engine 212, and engine 213, buffer interface block 220, acceleration component 230, fill component 240 and host 250. In one embodiment, the acceleration component 230 is dedicated to serving the graphics engine. Engine 211, engine 212, and engine 213, are communicatively coupled to frame buffer interface block 220, which is communicatively coupled to fill component 240. Fill component 240 in turn is communicatively coupled to acceleration component 230 and host 250.

The components of the graphics system cooperatively operate to perform graphics processing memory accesses. Engines 211, 212 and 213 process graphics information. Frame buffer interface block 220 enables efficient and independent access to a frame buffer. Arbiter 221 selectively arbitrates access requests from engines 211, 212, and 213 and forwards selected access requests to Hub TLB 225. Hub TLB 225 translates between virtual addresses and physical addresses. Acceleration component 230 enables accelerated processing of graphics information. In one embodiment, MTLBs 231, 232 and 233 handle translations between virtual and physical memory spaces in a level 1 cache and TLB 239 handles memory translations between virtual and physical memory spaces in a level 2 cache. Fill component 240 coordinates memory accesses independently as set forth above. Host 250 issues interrupts including interrupts for handling memory access faults.

Figure 3:
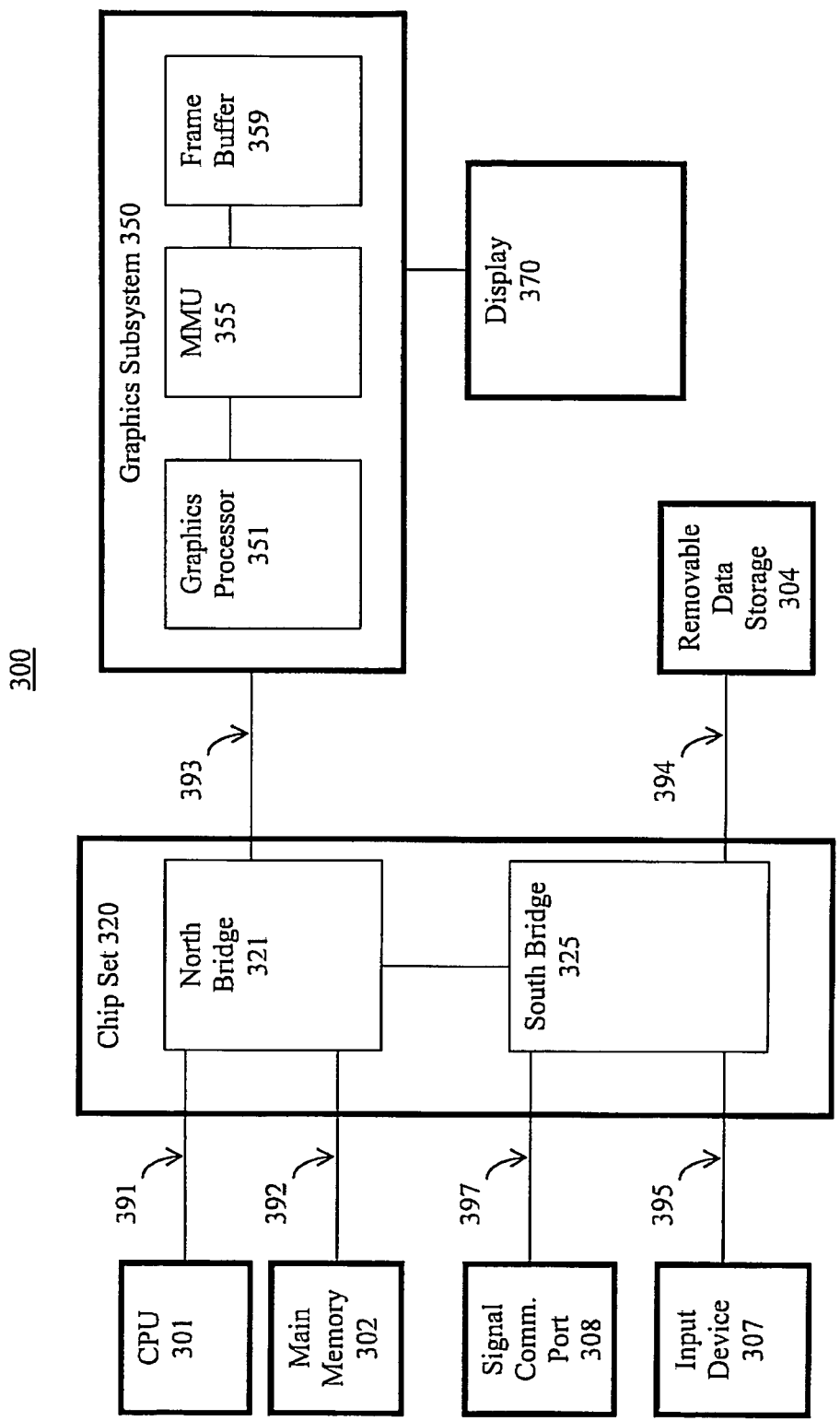
FIG. 3 is a block diagram of a computer system, one embodiment of a computer system upon which embodiments of the present invention can be implemented.

FIG. 3 is a block diagram of a computer system 300, one embodiment of a computer system upon which embodiments of the present invention can be implemented. Computer system 300 includes central processor unit 301, main memory 302 (e.g., random access memory), chip set 320 with north bridge 321 and south bridge 325, removable data storage device 304, input device 307, signal communications port 308, and graphics subsystem 350 which is coupled to display 370. Computer system 300 includes several busses for communicatively coupling the components of computer system 300. Communication bus 391 (e.g., a front side bus) couples north bridge 321 of chipset 320 to central processor unit 301. Communication bus 392 (e.g., a main memory bus) couples north bridge 321 of chipset 320 to main memory 302. Communication bus 393 (e.g., the Advanced Graphics Port interface) couples north bridge of chipset 320 to graphic subsystem 350. Communication buses 394-397 (e.g., a PCI bus) couple south bridge 325 of chip set 320 to removable data storage device 304, input device 307, signal communications port 308 respectively. Graphics subsystem 350 includes graphics processor 351, memory management unit 355 and graphics buffer 359.

The components of computer system 300 cooperatively operate to perform a variety of processing tasks and facilitate efficient memory accesses. Communications bus 391, 392, 393, 394, 395 and 397 communicate information. Central processor 301 processes information. Main memory 302 stores information and instructions for the central processor 301. Removable data storage device 304 also stores information and instructions (e.g., functioning as a large information reservoir). Input device 307 provides a mechanism for inputting information and/or for pointing to or highlighting information on display 370. Signal communication port 308 provides a communication interface to exterior devices (e.g., an interface with a network). Display device 370 displays information in accordance with data stored in frame buffer 359.

Graphics processor 351 processes graphics commands from central processor 301 and provides the resulting data to graphics buffers 359 for storage and retrieval by display monitor 370. Memory management unit 355 handles the memory access requests between graphics processor 351 and graphics buffers 359. In one embodiment, memory management unit 355 is similar to memory management unit 200. It is appreciated that similar memory management units can be implemented to facilitate efficient and independent access requests to other memory components of computer system 300, including main memory 302 and bulk data storage 304.

It is appreciated that the present invention can be implemented in a variety of embodiments. In one exemplary implementation the present invention can be utilized in processing systems utilized to provide a variety of graphics applications including video games. For example, the present invention can be utilized to facilitate virtual address to physical address translations in a game console, personal computer, personal digital assistant, cell phone or any number of platforms for implementing a video game. It is also appreciated that references to video game application implementations are exemplary and the present invention is not limited to these implementations.

Figure 4:
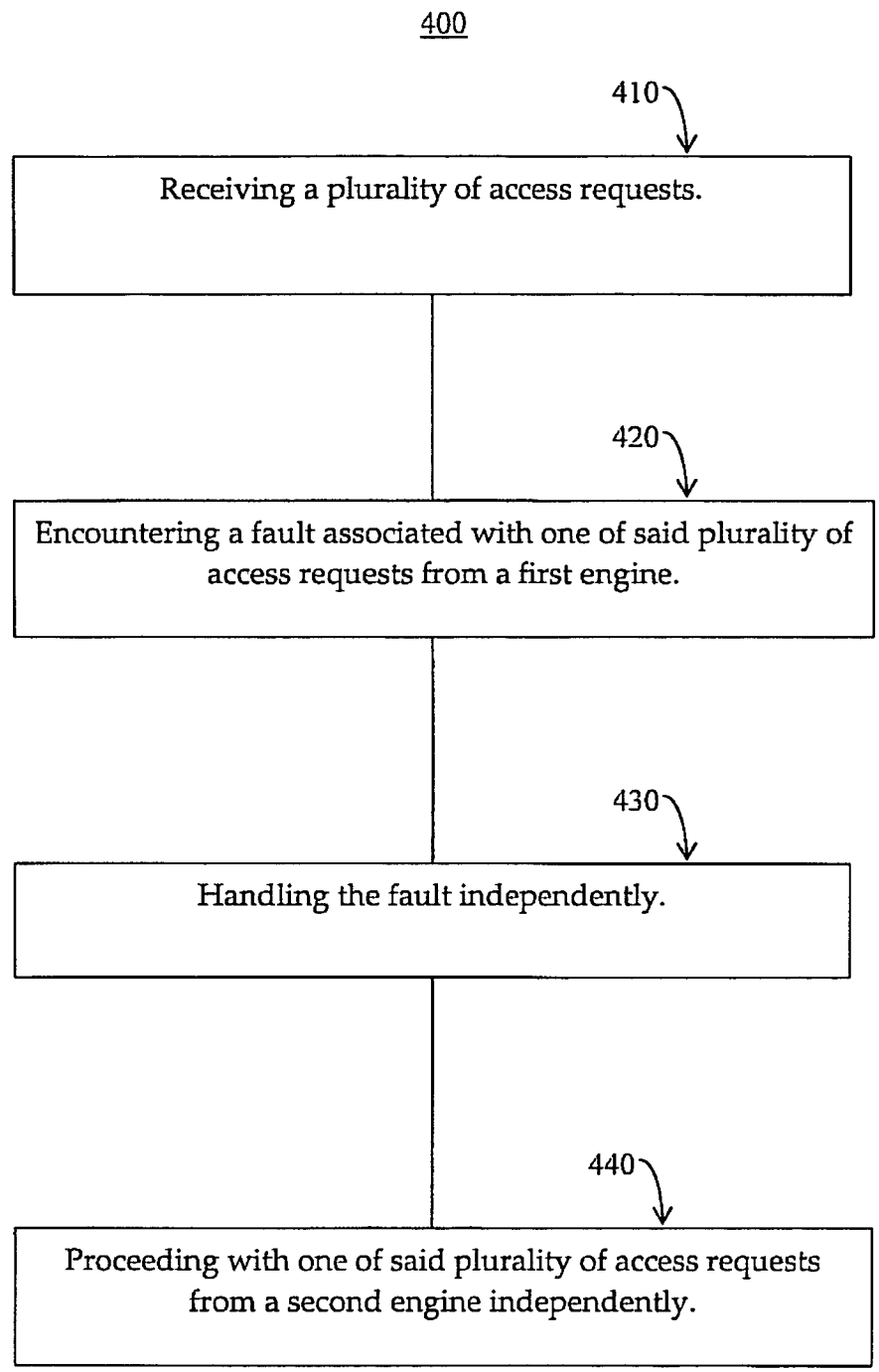
FIG. 4 is a flow chart of an exemplary memory management method in accordance with one embodiment of the present invention.

FIG. 4 is a flow chart of an exemplary memory management method 400 in accordance with one embodiment of the present invention. Memory management method 400 facilitates efficient and independent memory access fault recovery.

At block 410, a plurality of access requests are received. In one embodiment, the plurality of access requests are from a plurality of clients. It is appreciated the access requests can be directed to various MMU units. In one embodiment, level 1 cache memory units (e.g., micro TLB, Hub TLB, etc.) receive access requests and after MMU translation the request has an aperture field which notifies a frame buffer interface which destination the request should be forwarded to (e.g., frame buffer memory, dedicated memory, main system memory, etc.). One of the pluralities of access requests can be from a first engine and another one of the plurality of access requests can be from a second engine A fault associated with one of the plurality of access requests from a first engine is encountered at block 420. It is appreciated that the fault can include a variety of memory fault types. For example, a page directory entry or a page table entry can be invalid, a page size fault, out-of-bound pointer instance fault, invalid instance pointer fault, an instance bind fault, etc.

In block 430, the fault is handled independently. In one embodiment, handling the fault includes tracking faults from multiple engines independently (e.g. on a per engine basis). Handling the fault can include dropping subsequent access requests and preparing for a context swap. In one exemplary implementation, a stream of NACKs are forwarded in response to additional access requests from the one of the plurality of access requests from the first engine.

In one embodiment, the handling of the fault can be performed reactively or lazily. In both reactive and lazy approaches components further up a memory management hierarchy are notified of the fault. The components further up the memory management hierarchy also forward a stream of NACKs to other branches of the hierarchy in response to additional access requests from the first engine. In a lazy approach components in other branches of the memory management hierarchy are given a greater opportunity to continue to processing additional access requests before being notified of a fault and/or the context swap occurs. In a reactive approach components in other branches of the hierarchy are notified faster of a fault or context swap. For example, in a reactive approach the fault notification is provided more directly to components in other branches without having to wait for the fault to propagate up to the top of the hierarchy (e.g., a fill component) and then back down. In one embodiment, whether the fault handling is performed reactively or lazily is predetermined. In another embodiment, whether the fault handling is performed reactively or lazily is programmable.

In one embodiment, handling the fault also includes recovering from a fault indication. For example, an engine client stops operations, is swapped out, the fault is fixed, and the client and/or engine restarts. In one exemplary implementation, interrupts are independently issued and an interrupt service routine is performed. The first engine independently restarts after the fault.

At block 440, one of the plurality of access requests from a second engine is proceeded with independently. In one embodiment, processing of a second one of the plurality of access requests from a second engine continues while handling the fault associated with the first one of the plurality of access requests.

In one embodiment, a shared resource management method selectively issues the stream of NACKs. FIG. 5 is a flow chart of exemplary memory management method 500 in accordance with one embodiment of the present invention. In one embodiment, an attribute is added to segmentation data or context specifier data which specifies the semantics of a management memory unit if a previous fault has been encountered. The bit can specify if a translation request should be faulted if a previous request has faulted or if the translation request should be translated.

At block 510 an indication of a context session initiation is received. In one embodiment, the indication of a context session initiation is associated with a context switch after a fault.

A physical memory space is assigned to the context session at block 520. In one embodiment context save is directed to level 1 cache memory (e.g., micro TLB, hub TLB, etc.).

In block 530 virtual memory address to the assigned physical memory address translation is performed for context information associated with the context session.

In one embodiment, post-fault expediting responses are prevented from impacting accesses associated with the context information. In one embodiment, preventing a negative-acknowledgement (NACK) corresponding to a post-fault expediting response from being sent in response to an identified context information access request. In one embodiment, the MMU ignores a pending NACK if the attribute indicates the request is associated with a context specifier access.

In one embodiment context information access requests are identified. In one exemplary implementation an attribute is added to the segmentation data which specifies the semantics of the MMU if a previous fault is encountered. For example, an attribute is added to a context specifier structure which indicates a NACK should not be issued if a previous fault is encountered.

In one embodiment the restart includes a block bind. FIG. 6 is a flow chart of exemplary management method 600 in accordance with one embodiment of the present invention. In one embodiment memory management method 600 facilitates service of multiple individual engines with multiple contexts.

At block 610 an indication of a context session initiation is received. In one embodiment, wherein the context is stored in instance memory. In one exemplary implementation a notification of an engine changing channels is received. The indication of the context session initiation can be associated with a context time slice switch.

A block bind is performed at block 620. In one embodiment, the block bind includes associating an engine and a channel with a context. In one embodiment the channel includes a state vector that defines the state of the channel. For example, each channel is associated with a particular channel state and address translation.

In one embodiment, TLB entries corresponding to an engine initiating a block bind are invalidated and replaced with information utilized to direct virtual space to physical space translations associated with a new context. In one exemplary implementation the information is demand loaded (e.g., when a TLB needs the translation information it is fetched). In one exemplary implementation, a context specifier includes a block pointer or indication to an instance memory location storing information associated with the new context.

At block 630 a virtual memory address to physical memory address translation is performed for context information associated with the context session.

In one embodiment, management method 600 also includes coordinating multiple engines running on the same channel. In one exemplary implementation the coordinating includes avoiding save collisions. In one exemplary implementation, the coordinating includes initial memory allocation before actual execution. The initial allocation utilizes an "unvalidated" random pointer and a "real" value is put in when execution actually takes place.

Figure 7A:
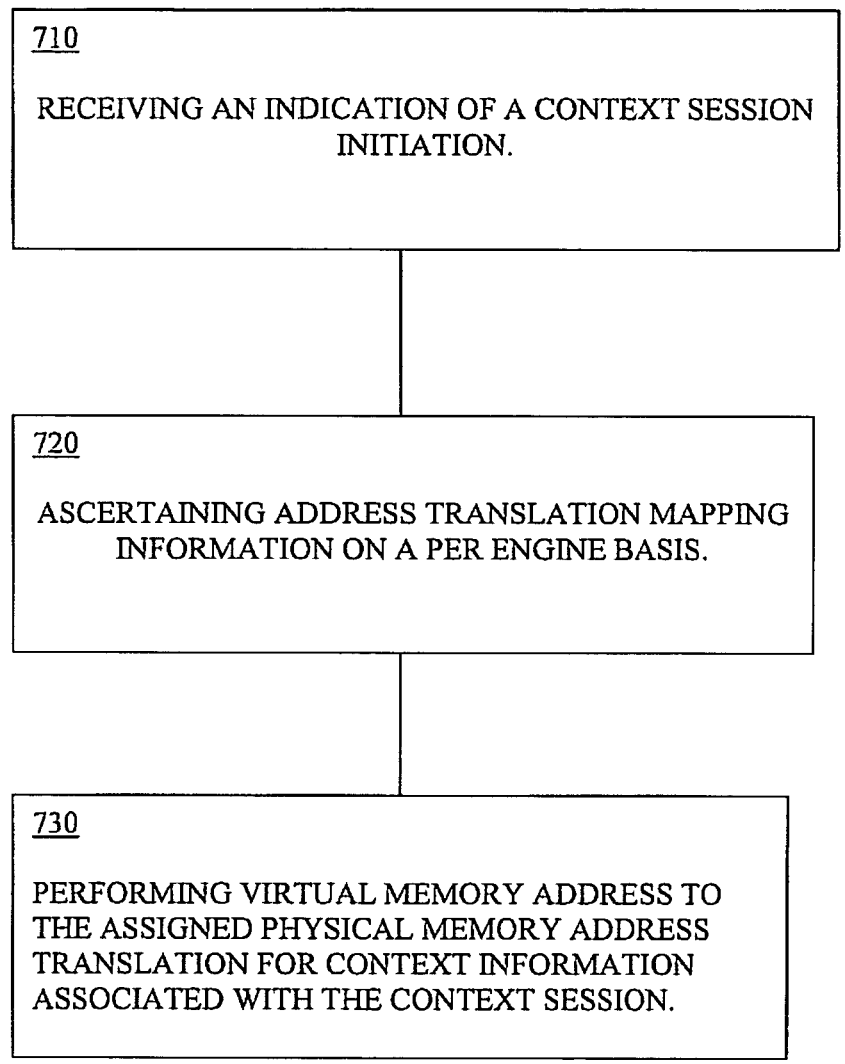
FIG. 7A is a flow chart of an exemplary memory management method in accordance with one embodiment of the present invention.

In one embodiment, translations are performed concurrently. FIG. 7A is a flow chart of memory management method 700 in accordance with one embodiment of the present invention.

At block 710 an indication of a context session initiation is received. In one embodiment, an indication of a context session initiation is received from an engine. In one embodiment, the a host decides when to end a current channel's time slice and an associated engine stores current context state and proceed notifies a memory management unit of the context switch. An indication of an invalidation can also come from software. In one exemplary implementation, software has changed some instance memory information and forces an invalidation of the information in a TLB without forcing the engine to change to a different context.

Address translation mapping information is ascertained on a per engine basis in block 720. For example, the translation information is retrieved from memory. The mapping can be maintained for each engine. In one embodiment, the mapping includes an engine identification and associated translation information locator address. In one exemplary implementation, the associated translation information locator address includes a base address of translation information.

In one embodiment address translation mapping information is cached with an engine identifier included in a tag of each entry. The tag is used to look up the base address of the translation information in memory.

In block 730 virtual memory address to physical memory address translation is performed in accordance with the translation information. The translation occurs across engines without interference. In one exemplary implementation, a request for translation includes a virtual address and an engine identifier. The pair is used to match against entries in a TLB. If no entry is found the engine identifier is utilized to look up the base address of the translation data in memory.

In one embodiment, MMU allocation bandwidth is dynamically adjusted between a plurality of engines.

Figure 7B:
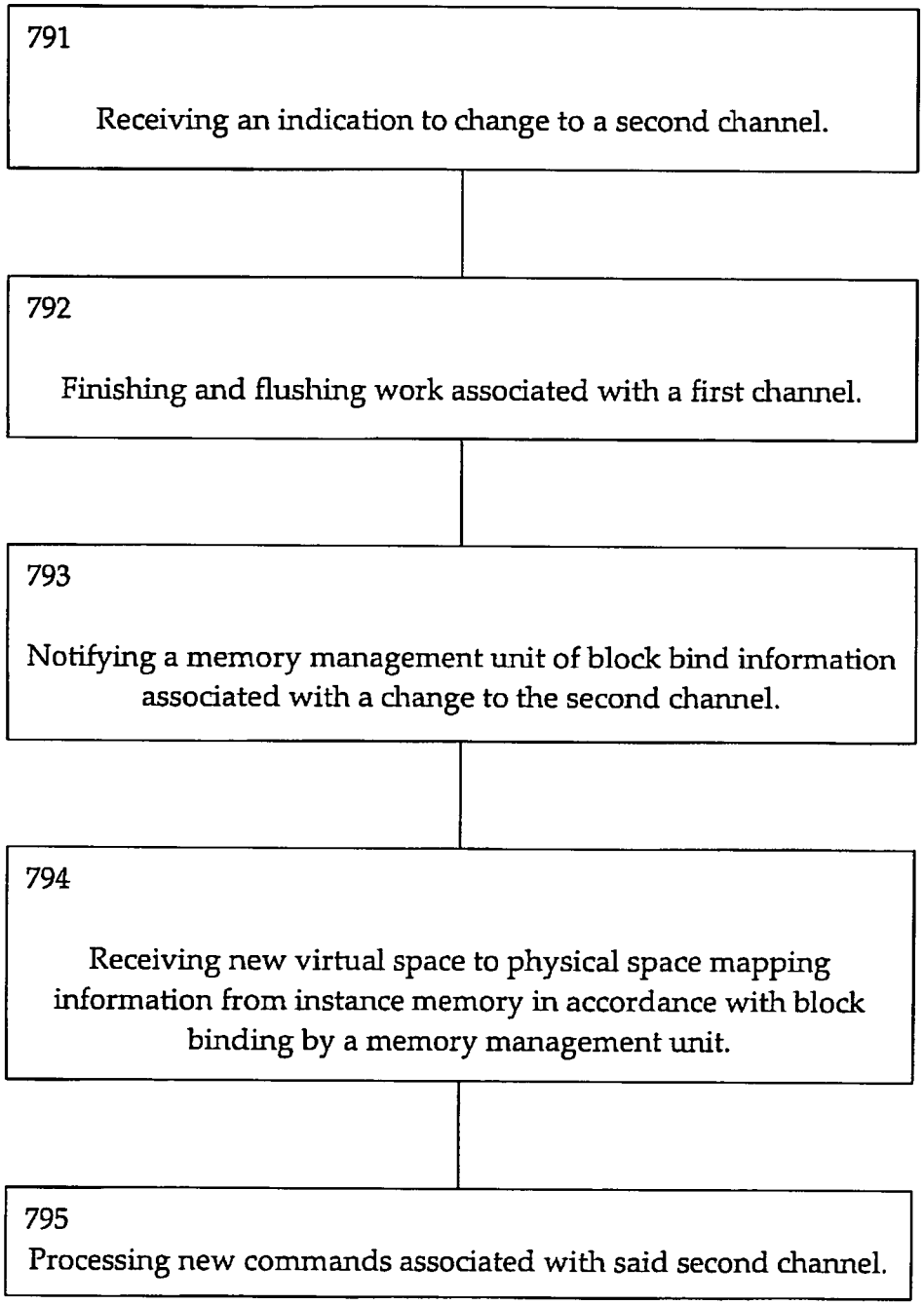
FIG. 7B is a flow chart of an exemplary engine initiated block bind method in accordance with one embodiment of the present invention.

FIG. 7B is a flow chart of exemplary engine initiated block bind method 790 in accordance with one embodiment of the present invention.

In block 791 an indication to change to a second channel is received. In one embodiment, an indication to change to a second channel is received from an engine. The indication to change to a second channel can also come from a host.

Work associated with a first channel is finished and flushed in block 792. In one embodiment the finishing and flushing work includes saving current context for information associated with the first channel. In one exemplary implementation the save is to a reserved area of instance memory.

In block 793 a memory management unit is notified of block bind information associated with a change to the second channel. In one embodiment, notifying includes identifying an instance memory block associated with the second channel. In one exemplary implementation the block bind information includes a base address of instance memory storing new translation information for a new context.

In block 794, new virtual space to physical space mapping information is retrieved from instance memory in accordance with block binding by a memory management unit. In one embodiment the block bind binding the base address of instance memory storing new translation information to a particular engine associated with the channel change.

New commands associated with the second channel are processed at block 795.

Figure 8:
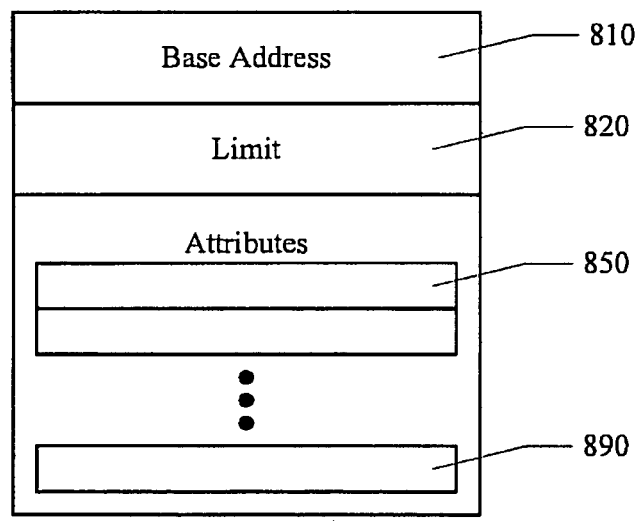
FIG. 8 is a block diagram illustration of an exemplary context specifier in accordance with one embodiment of the present invention.

Referring now to FIG. 8, a block diagram illustration of a context specifier 800, in accordance with one embodiment of the present invention, is shown. The context specifier 800 is a data structure that stores a base address 810, a limit 820, and one or more attributes 850, 890, etc. The attributes can be utilized to indicate a number of the present invention features, including NACK over ride. The NACK override indicator may be stored in one or more bits and the adjustments may be stored as a plurality of bits.

Figure 9:
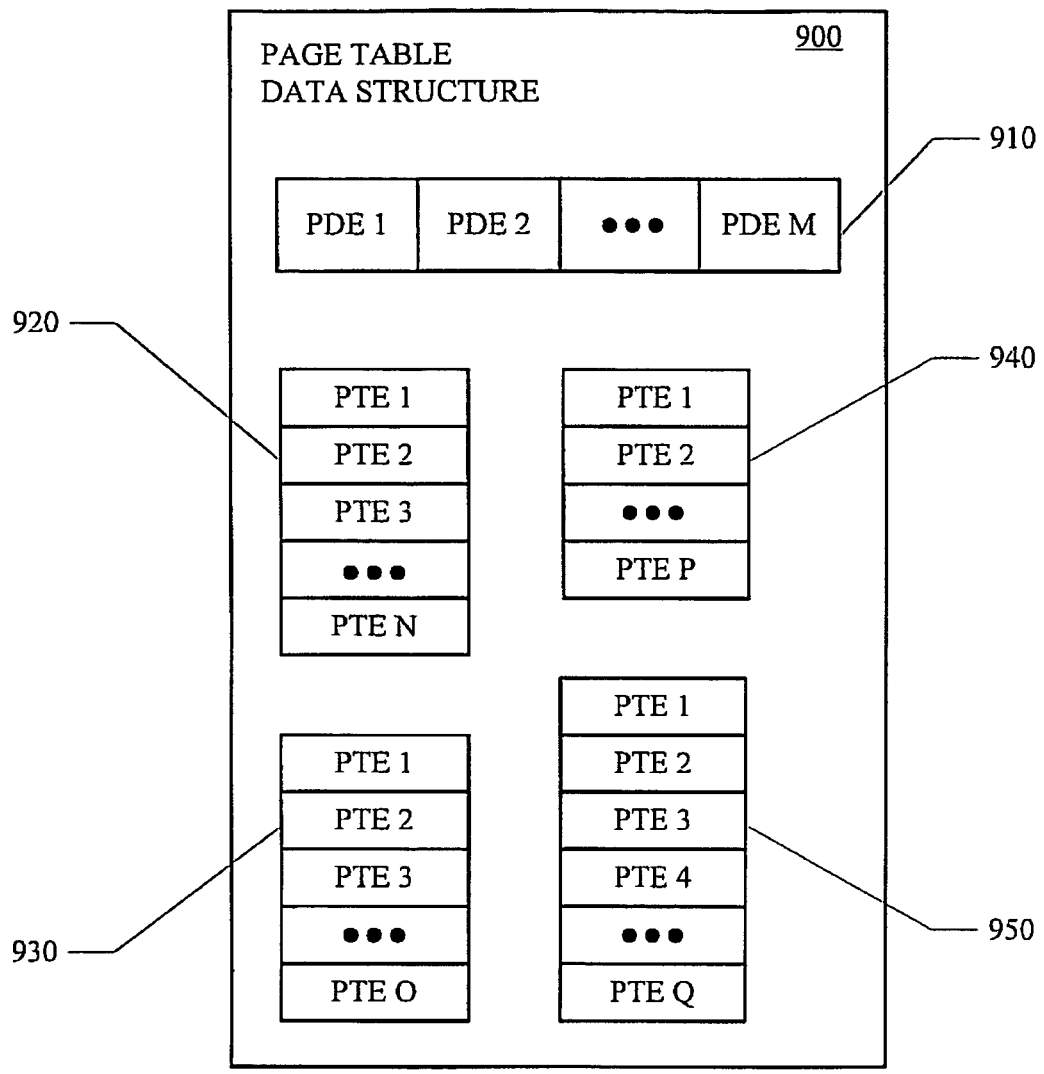
FIG. 9 is a block diagram of an exemplary page table data structure in accordance with one embodiment of the present invention.

FIG. 9 is a block diagram of an exemplary page table data structure 900 in accordance with one embodiment of the present invention. The illustrated two-level page table data structure 900 may include a page directory 910 and one or more page tables 920-950. The page directory 910 includes a plurality of page directory entries (PDE). Each PDE includes the address of a corresponding page table 920-950. Each PDE may also include a plurality of attributes. Each page table 920-950 includes one or more page table entries (PTE). Each PTE includes a corresponding frame number (e.g., physical page number). Each PTE may also include a plurality of attributes such as a dirty bit, an accessed bit, a page check disable bit, a page write transparent bit, a user accessible bit, a writeable bit, a present bit, a referenced bit, a hash function identification bit, a valid bit, an address compare bit, a changed bit, storage control bits, a no execute bit, page protection bits and/or the like. One or more of the attributes in the PDE and/or PTE may be the same attributes contained in the context specifier 800. For example, in one implementation, the attributes in the context specifier includes all of the attributes in the PTEs.

Figure 10:
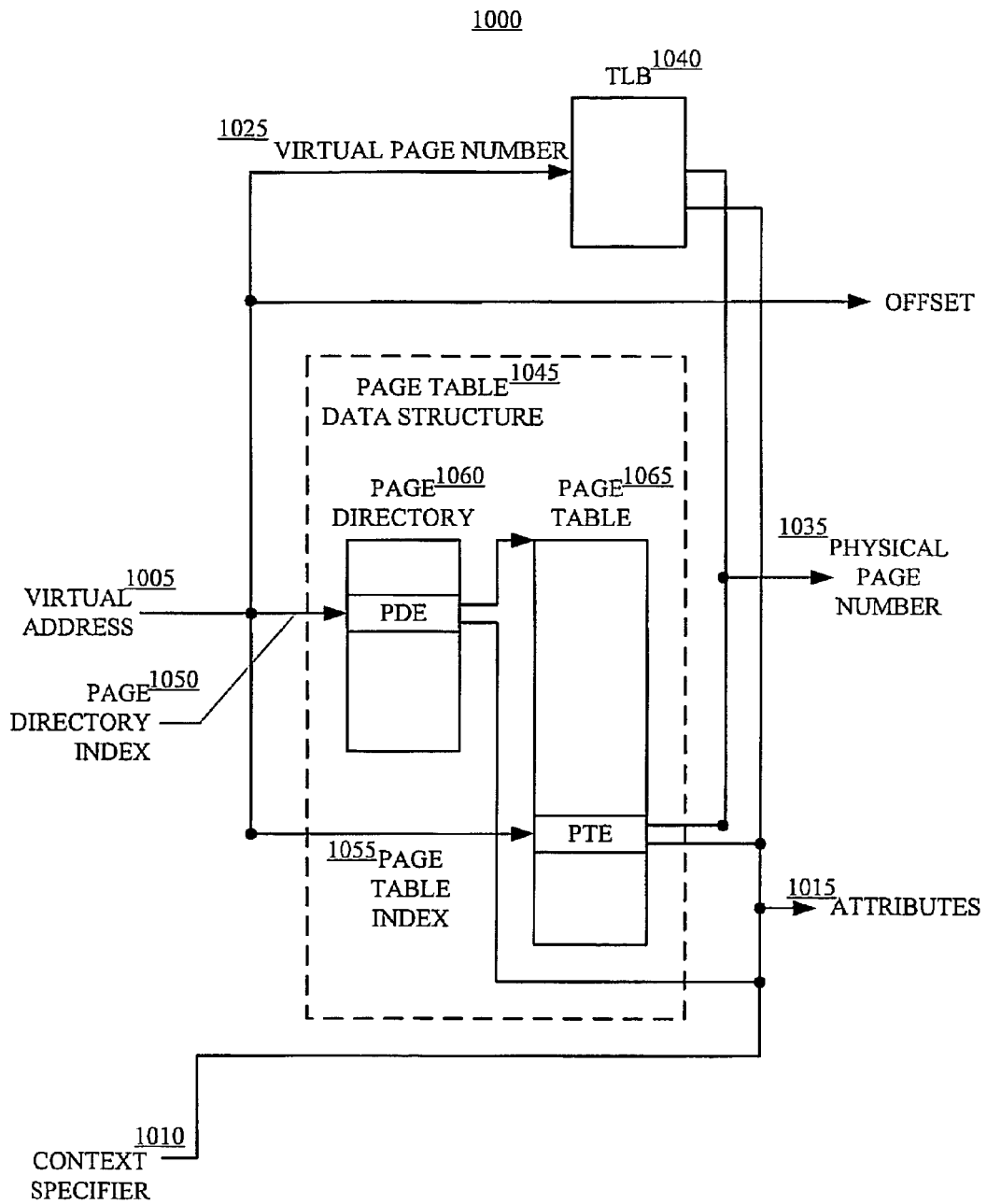
FIG. 10 is a block diagram of an exemplary system for translating virtual addresses to physical addresses in accordance with one embodiment of the present invention.

With reference now to FIG. 10, a block diagram of an exemplary system for translating virtual addresses to physical addresses in accordance with one embodiment of the present invention is shown. In one exemplary implementation, a virtual address 1005 and a context specifier 1010 are received. The context specifier 1010 includes one or more attributes 1015. The virtual address 1005 includes a virtual page number.

In one exemplary implementation, the virtual address 1050 is translated using a page table data structure 1045 which may be cached in TLB 1040. In particular, if a TLB 1040 includes a valid virtual-to-physical page mapping for the virtual page number 1025 (e.g., TLB hit) the appropriate physical page number 1035 is output from the TLB 1040. When the virtual page number 1025 is mapped to a given physical page number 1035 using the TLB 1040, the attributes used in the address translation process and/or output for use in accessing the memory may use attributes 1015 contained in the TLB 1040 or attributes of the context specifier 1010.

However, if the TLB 1040 does not include a valid mapping (e.g., TLB miss), the virtual address 1005 is translated using a page table data structure 1045. More specifically, the virtual page number 1025 includes a page directory index 1050 and a page table index 1055. The page directory index 1050 in the virtual address 1005 is used to index a given page directory 1060. The page directory entry (PDE) indexed by the page directory index 1050 includes an address of a given page table 1065. The page table index 1055 in the virtual address 1005 is used to index the given page table 1065 located at the address specified in the PDE. The page table entry (PTE) indexed by the page table index 1055 includes the physical page number 1035. When the virtual page number is translated to a given physical page number 1035 using the page table data structure 1045, the attributes 1015 used in the address translation process and/or output for use in accessing the memory may be attributes 1015 specified in the given PDE and/or PTE, or attributes 1015 of the context specifier 1010.

In one embodiment, the present invention includes a page table entry override capability. If the page table entry override capability is engaged an adjustment in the attributes of a context specifier is utilized in determining the physical page number.

It is appreciated, embodiments of the present invention can facilitate virtual address translation to physical addresses of information located in a variety of memory types including, level 1 cache memory, level 2 cache memory, frame buffer memory, dedicated memory, main system memory, and etcetera.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A shared resource management system comprising:
a plurality of engines for performing processing;
a memory for supporting said processing by storing information, wherein said memory includes instance memory; and
a memory management unit for coordinating binding of context information associated with memory access requests from said plurality of engines, including controlling access independently to the context information without interference from other engine activities.

2. A shared resource management system of claim 1 wherein said context information is included in a block.

3. A shared resource management system claim 1 wherein said memory management unit binds a particular block in instance memory to a particular engine.

4. A shared resource management system of claim 1 wherein said instance memory is protected.

5. A shared resource management system of claim 1 wherein said instance memory supports multiple channels associated with said plurality of engines.

6. A shared resource management system of claim 1 wherein said instance memory includes a pointer to a page table.

7. A shared resource management system of claim 1 wherein said instance memory includes context save and restore data and each one of said plurality of engines initiates a unique block bind by indicating an association between their engine identification (ID) and a given block of instance memory.

8. A memory management method comprising:
receiving an indication of an initiation of a context session;
performing a block bind, wherein said block bind includes associating an engine and a channel with a context;
performing virtual memory address to an assigned physical memory address translation for context information associated with said context session; and
controlling access independently to the context information without interference from other engine activities, wherein said controlling access independently to the context information without interference from other engine activities includes allowing a second engine to access the context information even if a fault occurs while a first engine is attempting to access the context information.

9. A memory management method of claim 8 wherein said context is stored in instance memory.

10. A memory management method of claim 8 further comprising receiving notification of an engine changing channels.

11. A memory management method of claim 8 wherein said channel includes a state vector that defines a state of said channel.

12. A memory management method of claim 8 wherein said indication of said context session initiation is associated with a context time slice switch.

13. A memory management method of claim 8 wherein the channel is associated with a particular channel state and address translation.

14. A memory management method of claim 8 further comprising coordinating multiple engines running on the same channel.

15. A memory management method of claim 14 wherein said coordinating includes avoiding save collisions.

16. An engine initiated block bind method comprising:
receiving an indication to change to a second channel;
finishing and flushing work associated with a first channel, wherein said finishing and flushing work includes saving current context information associated with said first channel and access is controlled independently to the context information without interference from other engine activities;
notifying a memory management unit of block bind information associated with a change to said second channel;
receiving new virtual space to physical space mapping information from instance memory in accordance with block binding by a memory management unit;
processing new commands associated with said second channel.

17. An engine initiated block bind method of claim 16 wherein said saving is to a reserved area of instance memory.

18. An engine initiated block bind method of claim 16 wherein said notifying includes identifying an instance memory block associated with said second channel.

\* \* \* \* \*